United States Patent [19]

Miller

[11] Patent Number: 4,519,122

[45] Date of Patent: May 28, 1985

[54] PULLER MECHANISM FOR ASSEMBLING PIPELINES

[76] Inventor: Thomas P. Miller, 1322 Second St., #18, Santa Monica, Calif. 90401

[21] Appl. No.: 485,868

[22] Filed: Apr. 18, 1983

[51] Int. Cl.$^3$ .............................................. B23P 19/04
[52] U.S. Cl. ........................................ 29/237; 29/267
[58] Field of Search ......................... 29/237, 238, 267

[56] References Cited

U.S. PATENT DOCUMENTS

| | | | |
|---|---|---|---|
| 2,958,125 | 11/1960 | Nichols | 29/237 |
| 3,096,572 | 7/1963 | Simmons | 29/237 |
| 3,281,929 | 11/1966 | Shinnick | 29/237 |
| 3,414,961 | 12/1968 | Bjalme | 29/237 |
| 3,471,919 | 10/1969 | Evans | 29/237 |
| 3,571,896 | 3/1971 | Wilkerson | 29/237 |
| 4,178,668 | 12/1979 | George | 29/237 |

*Primary Examiner*—James L. Jones, Jr.
*Attorney, Agent, or Firm*—Keith D. Beecher

[57] ABSTRACT

A puller mechanism for moving the end of a pipe into a collar mounted on a second aligned pipe in order to assemble a pipeline. The mechanism is constructed to be used in conjunction with heavy pipes, such as, for example, Johns-Manville Transite asbestos/cement pressure pipes. The mechanism includes a first semi-circular yoke assembly which is clamped to the pipe, and a second yoke assembly whose legs straddle the collar. The second yoke assembly is pivotally coupled to the first yoke assembly by a pair of arms on opposite sides of the first pipe. An elongated operating handle extends outwardly from the bight section of the second yoke, and the handle is used to turn the second yoke about a fulcrum. Two L-shaped members supported at the ends of the leg sections of the second yoke engage the rim of the collar to constitute the required fulcrum, so that when the handle is turned the end of the first pipe is pulled into the collar. A plurality of elongated guides may be provided which extend from the first yoke along the first pipe and collar to guide the end of the first pipe into the collar. The L-shaped members may be replaced by spike members which extend into the ground to form the desired fulcrum.

6 Claims, 4 Drawing Figures

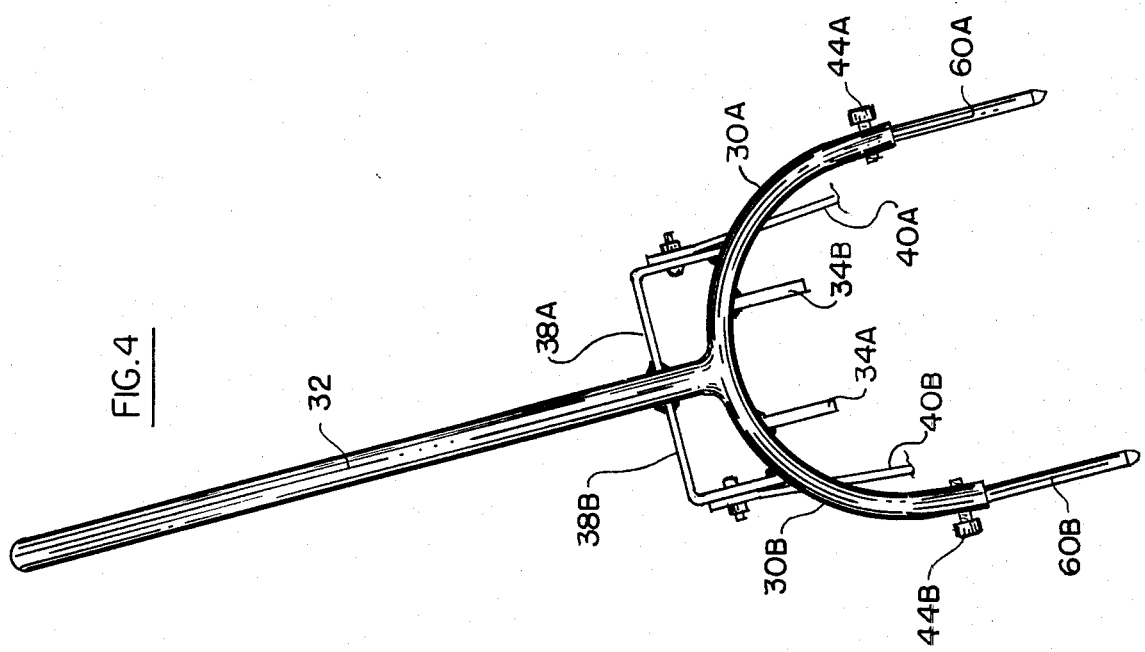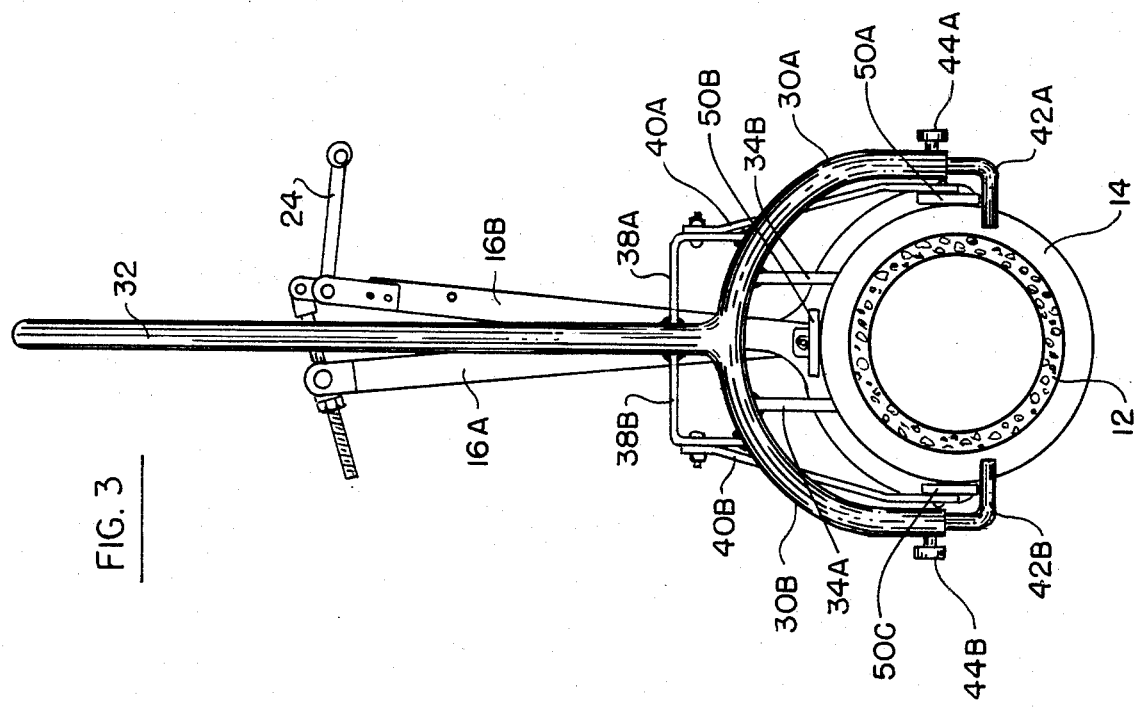

PULLER MECHANISM FOR ASSEMBLING PIPELINES

BACKGROUND OF THE INVENTION

Asbestos/cement or plastic (PVC) high pressure pipes are presently in widespread use. These pipes are usually distributed with an annular collar at one end of each pipe in press fit with the pipe, and with the other end of each pipe tapered slightly to be received telescopically in the collar of an adjacent aligned pipe when a pipeline is being formed.

In the assembly of such a pipeline, it is necessary for each pipe to be pulled in the direction of the aligned collar until its tapered end extends into the collar. Since the pipes are extremely heavy and since considerable force is required to draw them together, more force is required than workmen can readily exert directly on the pipes, especially when the pipes are at the bottom of a trench, which is usually the case. Therefore, various devices have been devised in the prior art to provide the necessary mechanical advantage to enable the workmen to draw the pipes together. It is necessary that such devices apply little, if any, lateral force to the pipes as they are drawn together in order to maintain the pipes in alignment.

As mentioned above, it is the usual practice to assemble the pipes at the bottom of a trench. The width of the trench is made as narrow as possible to reduce costs. Thus the device used to assembly the pipes should be compact in size in order to accommodate this minimum trench width, and must also lend itself to operation while in the trench.

Devices capable of joining pipes under the conditions outlined above are known to the art. Such devices are disclosed, for example, in Simmons U.S. Pat. No. 3,096,572 and in Wilkerson U.S. Pat. No. 3,571,896. However, although these devices do perform the required functions, they are still somewhat difficult to operate, and often require several persons to operate the devices and assemble the pipeline, especially when heavy asbestos/cement pipes are used.

An objective of the present invention is to provide an improved mechanism which is simple and inexpensive in its construction, and which may be used in a narrow trench to draw aligned pipes into coupling engagement with one another, and which fulfills all the criteria outlined in the preceding paragraphs, and which reduces to a minimum the number of workmen required to assemble the pipeline.

BRIEF DESCRIPTION OF THE DRAWINGS

FIG. 3 is a front view of the mechanism of FIG. 1; and

FIG. 4 is a view, like FIG. 1, of a modification of the embodiment of FIGS. 1, 2 and 3.

DETAILED DESCRIPTION OF THE ILLUSTRATED EMBODIMENT

Figure 2:
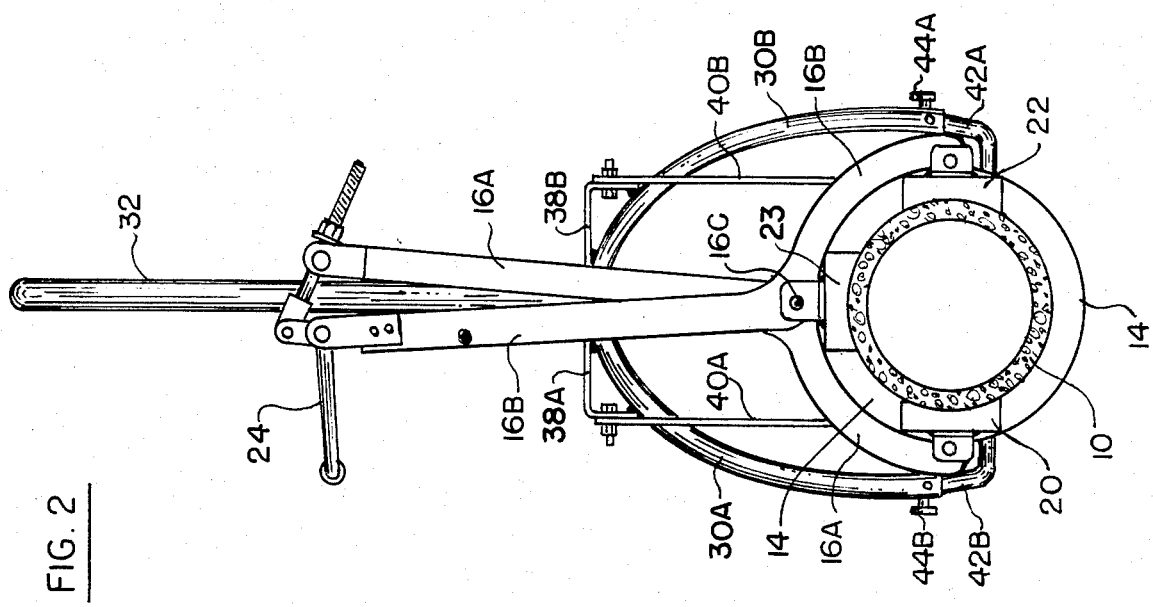
FIG. 2 is a rear view of the mechanism of FIG. 1.
Figure 1:
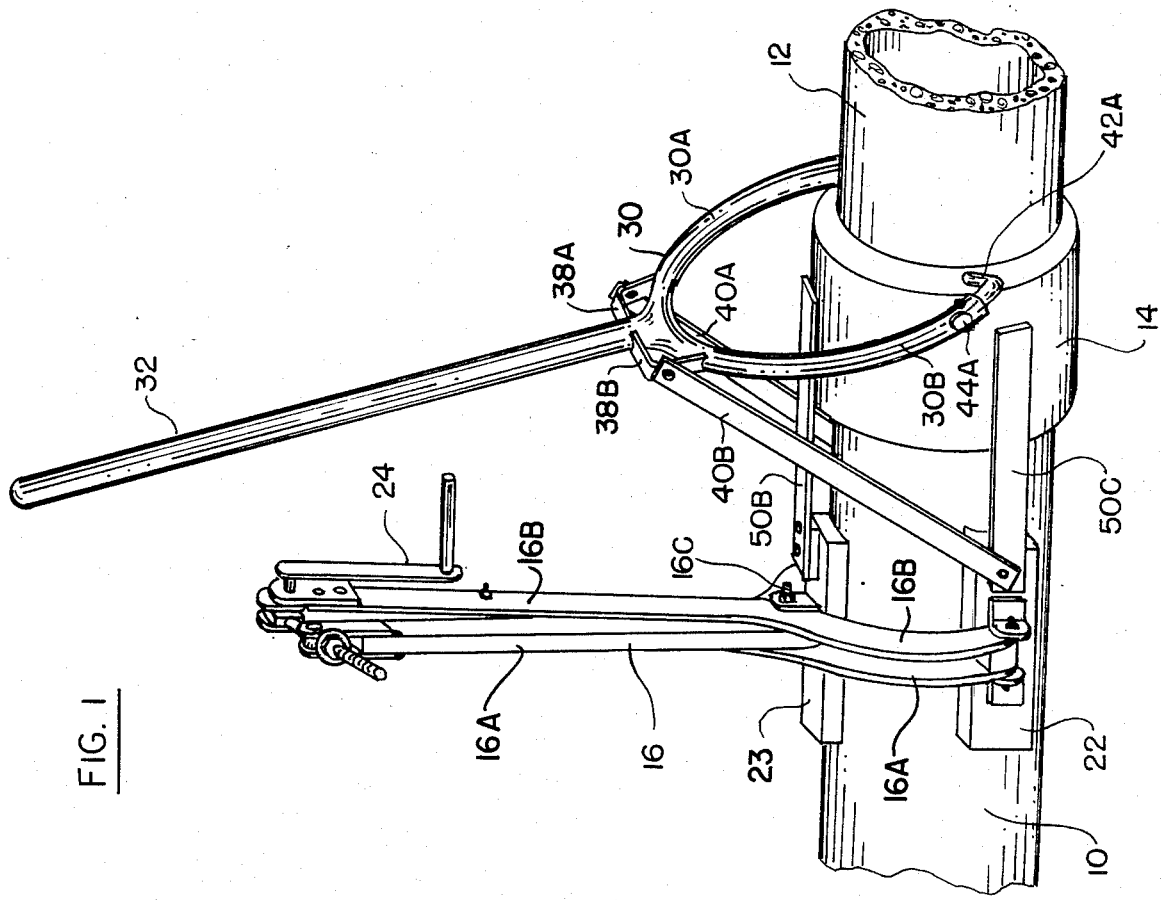
FIG. 1 is a side elevational view of one embodiment of the mechanism of the invention.

As shown in FIGS. 1, 2 and 3, the mechanism of the present invention is intended to pull a first pipe 10 in the direction of an aligned second pipe 12 so that the end of the first pipe will extend into a collar 14 mounted on the second pipe. Pipes 10 and 12 may be heavy asbestos/cement pressure pipes of the type sold by Johns-Manville under the trademark "Transite".

The mechanism includes a first yoke assembly 16 which, as best shown in FIG. 2, includes two sections 16A and 16B which are pivoted to one another by a pin 16C, and when the two sections 16A and 16B are pivotally moved about the axis of pin 16C, they cause the legs of the yoke assembly to move against pipe 10, so that the yoke assembly 16 may be clamped against the pipe. Appropriate clamping pads 20, 22 and 23 may be provided between the yoke 16 and the pipe. The upper ends of the sections 16A, 16B are coupled together to a known type of clamping device designated 24 and which includes a lever which may be turned to clamp the yoke against the pipe 10, and a further threaded control which may be turned to tighten the clamping action.

The mechanism includes a second yoke assembly 30 which includes a pair of leg sections 30A and 30B which straddle the collar 14. The second yoke also includes a bight section 30C, and a handle 32 extends outwardly from the bight section. A pair of brackets 34A and 34B (FIG. 3) extend downwardly from the bight section and rest on the outer perimeter of the collar 14.

A further pair of brackets 38A and 38B are mounted on the bight section 30C, and two arms 40A and 40B are each pivotally mounted at one end to the respective brackets 38A and 38B. The arms 40A and 40B extend on opposite sides of pipe 10 and collar 14, as shown. The other ends of the arms 40A and 40B are pivotally coupled to the pads 20 and 22 of yoke assembly 16.

In the embodiment of FIGS. 1, 2 and 3, a pair of L-shaped brackets 42A and 42B are removably mounted to the ends of legs 30A and 30B by appropriate screws 44A and 44B. The L-shaped brackets 42A and 42B engage the edge of collar 14 remote from pipe 10 to form a fulcrum for the mechanism, so that when handle 32 is turned in a clockwise direction in FIG. 1, the members 42A and 42B engage the collar, and serve as a fulcrum for the handle 32 as it draws the pipe 10 into the collar by the force exerted through arms 40A and 40B.

Elongated guide strips 50A, 50B and 50C are mounted to the second yoke assembly 16, and these guide strips extend along the pipe 10 and along the collar 14, as shown, and serve to guide the end of the pipe 10 into the collar as the handle 32 is turned in a clockwise direction.

By use of the mechanism of the present invention, it is possible for a single workman to assemble the pipeline, since when the pipes are laid in the trench, they can be pulled into coupled relationship by operation of the mechanism, as described above, with the end of each pipe being guided into the coupling on the end of the adjacent pipe by the mechanism itself.

In the embodiment of FIG. 4 the L-shaped members 42A and 42B are replaced by spikes 60A and 60B. These spikes extend into the ground at the bottom of the trench, and cause the mechanism to pull the pipe 10 along the ground into the collar 14 as the handle is turned.

It is evident, therefore, that while particular embodiments of the invention have been shown and described, modifications may be made. It is intended in the claims to cover the modifications which come within the spirit and scope of the invention.

What is claimed is:

1. A mechanism for moving the end of a first pipe into coupling engagement with an annular collar mounted on a second aligned pipe, said annular collar forming a shoulder with respect to said second pipe, said mechanism comprising: a first generally semi-circular yoke assembly including a pair of arcuate sections adapted to extend around the first pipe, the arcuate sections of said first yoke assembly being pivotally coupled to one another, said first yoke assembly further including two corresponding elongated sections extending upwardly from the arcuate sections, and a clamping mechanism mounted at the upper ends of said elongated sections to cause said pair of arcuate sections to be clamped to the first pipe; a second yoke assembly having an intermediate bight section and further having a pair of leg sections depending from said bight section and spaced from one another, said second yoke assembly being adapted to straddle the collar mounted on the second aligned pipe; a pair of arm members disposed on opposite sides of the first pipe and collar, each of said arm members being pivotally coupled at one end to the first yoke assembly, and being pivotally coupled at the other end to the second yoke assembly; an elongated handle extending outwardly from the bight section of the second yoke assembly; and the legs of said second yoke assembly having respective ends configured to provide a fulcrum so that the first pipe and second pipe may be drawn together as the handle is turned with the end of the first pipe entering the collar.

2. The mechanism defined in claim 1, and which includes a plurality of elongated guide members each secured at one end to the first yoke assembly and extending along the first pipe and collar to guide the end of the first pipe into the collar as the handle is turned.

3. The mechanism defined in claim 1, in which the ends of the legs of said second yoke assembly comprise a pair of L-shaped members respectively mounted on the legs of said second yoke assembly in position to engage the shoulder formed by said collar.

4. The mechanism defined in claim 1, in which the ends of the legs of said second yoke assembly comprise a pair of spike members respectively mounted in the legs of the second yoke assembly and extending outwardly from the legs to be received in the ground supporting the first and second pipes.

5. The mechanism defined in claim 3, in which said L-shaped members are removably mounted in the legs of said second yoke assembly.

6. The mechanism defined in claim 4, in which said spike members are removably mounted in the legs of said second yoke assembly.

* * * * *